May 26, 1925.  1,539,604

P. E. SCHELL

PANEL OR CURTAIN CONSTRUCTION

Filed Nov. 22, 1922

Inventor
Paul E. Schell,
By
Attorneys

Patented May 26, 1925.

1,539,604

UNITED STATES PATENT OFFICE.

PAUL E. SCHELL, OF DETROIT, MICHIGAN.

PANEL OR CURTAIN CONSTRUCTION.

Application filed November 22, 1922. Serial No. 602,514.

*To all whom it may concern:*

Be it known that I, PAUL E. SCHELL, a citizen of the United States of America, residing at Detroit, in the county of Wayne and State of Michigan, have invented certain new and useful Improvements in Panel or Curtain Constructions, of which the following is a specification, reference being had therein to the accompanying drawings.

This invention relates to an automobile panel, curtain or the like adapted to form part of an automobile body, particularly a collapsible or foldable automobile top which is provided with side panels or curtains to afford an enclosure on the automobile body for winter use, the side panels or curtains being demountable and adapted to be removed, in the summer.

My invention aims to provide a rigid panel or curtain that may be mounted on an automobile body attached to the usual top, either as a stationary panel or as a movable panel to swing with a door, gate or other movable member of the automobile body. My invention particularly resides in the construction of the panel per se, and my invention, in its broadest aspect, involves connecting covers or like parts to a rigid non-metallic body, by sewing, the stitches passing through the rigid body just as though said body were flexible similar to cloth.

The panels which have been put into use for bodies made of stiff fibrous boards provided with light openings and frames in which the lights are mounted, said bodies and frames being covered to protect the same against the elements with the covers stitched to the panel bodies and also adhesively secured to said bodies and frames. In using stiff boards in contradistinction to flexible metallic bodies, wood bodies and the like I provide a comparatively cheap panel, light in weight, and as serviceable.

The construction entering into the panel will be hereinafter described and then claimed, and reference will now be had to the drawing, wherein—

Figure 1:
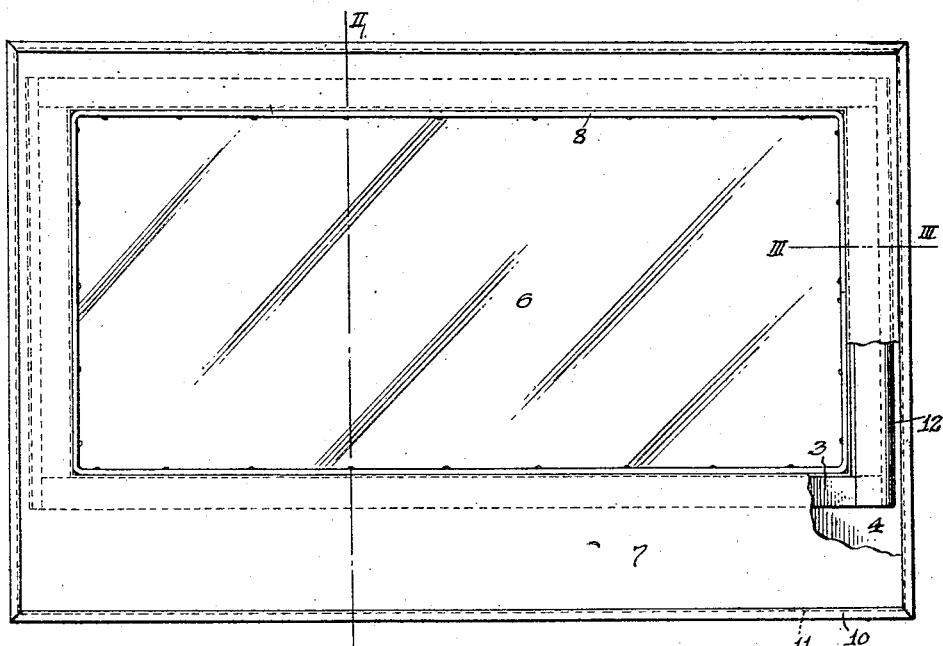
Figure 1 is a side elevation of the inner face of a panel in accordance with this invention, the panel being partly broken away to illustrate a light frame.
Figure 2:
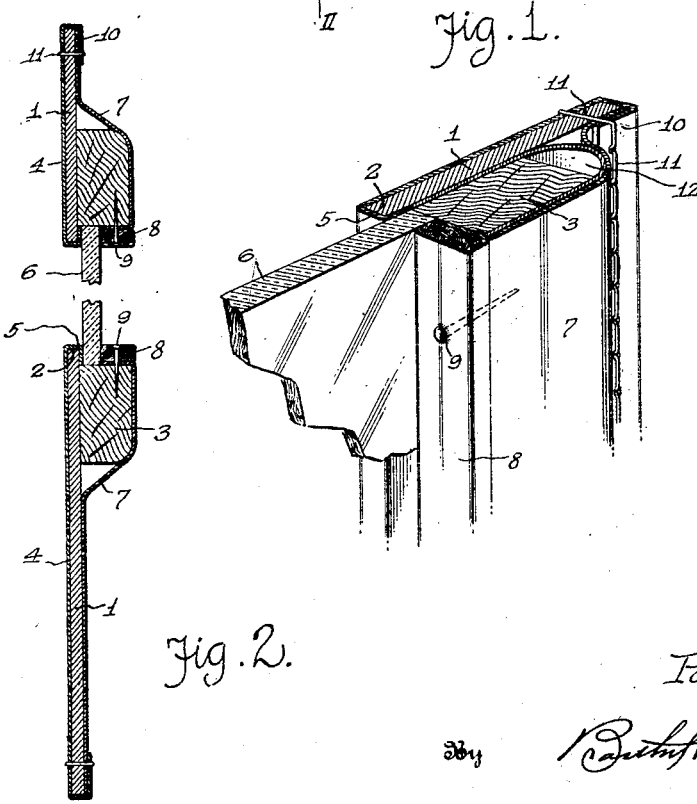
Fig. 2 is an enlarged cross sectional view taken on the line II—II of Fig. 1.

In the drawing the reference numeral 1 denotes a panel or curtain body made of stiff or rigid fibrous or cellular board, for instance the well known "Beaver" board, such comparing to thick laminated card or paste board and possessing practically the same rigidity as a body made of wood or other material. The body 1 is provided with a light opening 2 and mounted on the inner face of the body, adjacent the marginal edges of the opening 2, is a frame 3, preferably made of wood.

Adhesively secured to the outer face of the body 1 is an outer cover 4, preferably of a flexible water proof material, as imitation leather, and the edges of this outer cover are inturned about the marginal edges of the opening 2 to protect the edges of the body 1 and afford a seat 5 for a light 6 in the frame 3.

Adhesively secured to the inner face of the body 1 and the frame 3 is an inner cover or lining 7 made of a material similar to the outer cover 4, and the inner edges of the inner cover are inturned and secured to the frame 3.

A retaining frame 8 is set in the frame 3, against the light 6 and on the inturned edges of the inner cover 7 and secured to the frame 3 by tacks 9 or other fastening means.

The outer edges of the inner cover 7 terminate at the outer edges of the body 1 and the outer edges of the outer cover 4 are folded around the edges of the body 1 on to the outer edges of the inner cover 7 so that said covers overlap, as at 10. The edges of the cover are then connected to the body 1 by sewing, the stitches 11 extending through the rigid body 1 so that the covers will be held in addition to the glue or adhesive connecting said covers to the body and frame.

Figure 3:
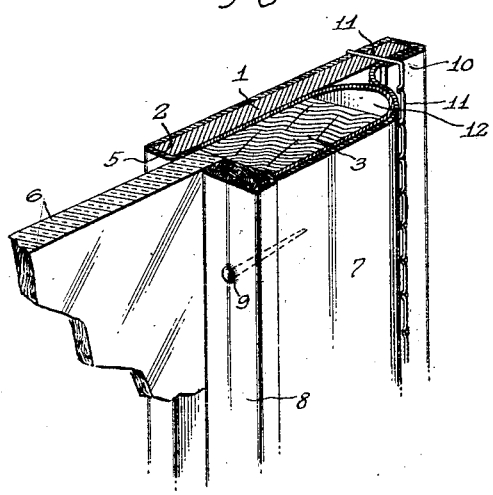
Fig. 3 is an enlarged perspective view of a portion of the frame illustrating a horizontal section on the line III—III of Fig. 1.

In some instances, I may provide the frame 3 with cushion members 12 in the form of strips of material adhesively secured to the frame 3 and forming a cushion or buffer under that portion of the inner cover 7 at the outer edge of the frame 3, and this cushion or buffer will form a yieldable ledge or shoulder which may permit of the panel being seated against an automobile body or wall. Furthermore, a strip of material forming the cushion 12 will round off or mold the connection between the frame 3 and the body 1 formed by the inner cover extending from said frame on to the body. This is best shown in Fig. 3.

I attach considerable importance to the fact that my panel, curtain or wall member includes a non-metallic rigid body which may be placed in a sewing machine and have the covers sewed to said body. It is obvious that a body made of wood or metal would prohibit such sewing, yet by using heavy board my panel possesses practically the same rigidity as though wood or metal were used.

What I claim is:—

An automobile light panel made of a stiff and relatively thick fibrous composite board provided with a light opening, a light for the board opening, a wooden frame on the inner side of said board about the board opening, a cushioning member at the outer edge of said frame and secured to the front and rear faces of said frame, a lining on said frame extending on to the inner face of said board cooperating with said frame and board in enclosing said cushion member, a cover on the outer face of said board, and extending over the edge of said board and overlapping the edge of said lining, and stitches extending through said board, said lining and the overlapped edge of said cover.

In testimony whereof I affix my signature in presence of two witnesses.

PAUL E. SCHELL.

Witnesses:
  KARL H. BUTLER,
  CHAS. W. STAUFFIGER.